United States Patent
Li et al.

(10) Patent No.: US 12,499,096 B2
(45) Date of Patent: Dec. 16, 2025

(54) MANAGEMENT OF DISTRIBUTED DATABASE NODES WITHIN A CUSTOMER NETWORK

(71) Applicant: Dell Products L.P., Round Rock, TX (US)

(72) Inventors: Wenfeng Li, Shanghai (CN); Stéphane Meng, Shanghai (CN); Chen Liang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 345 days.

(21) Appl. No.: 17/689,132

(22) Filed: Mar. 8, 2022

(65) Prior Publication Data

US 2023/0267101 A1    Aug. 24, 2023

(30) Foreign Application Priority Data

Feb. 22, 2022    (CN) .......................... 202210164360.X

(51) Int. Cl.
  *G06F 16/182*    (2019.01)
  *G06F 16/27*    (2019.01)
(52) U.S. Cl.
  CPC ............ *G06F 16/182* (2019.01); *G06F 16/27* (2019.01)
(58) Field of Classification Search
  None
  See application file for complete search history.

(56) References Cited

U.S. PATENT DOCUMENTS

| | | | |
|---|---|---|---|
| 11,349,710 B1* | 5/2022 | Nelson | C07K 16/2803 |
| 11,516,033 B1* | 11/2022 | Kothuri | H04L 12/14 |
| 2012/0166390 A1* | 6/2012 | Merriman | G06F 16/2365 |
| | | | 707/613 |
| 2016/0042014 A1* | 2/2016 | Jalan | H04L 45/02 |
| | | | 707/610 |
| 2017/0262519 A1* | 9/2017 | Horowitz | G06F 11/1458 |
| 2017/0371650 A1* | 12/2017 | Li | G06F 8/61 |
| 2021/0337046 A1* | 10/2021 | Zhou | H04L 67/1008 |
| 2022/0292092 A1* | 9/2022 | Brown | G06F 16/2471 |

* cited by examiner

*Primary Examiner* — Christopher J Raab
(74) *Attorney, Agent, or Firm* — Jackson Walker L.L.P.

(57) ABSTRACT

A distributed database management system includes a centralized management module for managing resources within a customer network. The management module software, e.g., vCenter, or a health state plugin of the management module, accesses health state information from distributed database nodes within the customer network. The health state information may be or may include a simple signal, analogous to a heartbeat signal, that each functional node generates periodically and sends to the management module. The nodes may include a primary node to maintain a database and one or more secondary nodes to replicate the database. The primary and secondary nodes may be nodes within an edge node cluster of the customer network. The edge node cluster may be implemented within an infrastructure appliance, e.g., VxRail. The management module shares the health state information with the nodes and controls, based on the health state information, the designation of a primary node and secondary nodes.

10 Claims, 2 Drawing Sheets

MANAGEMENT OF DISTRIBUTED DATABASE NODES WITHIN A CUSTOMER NETWORK

TECHNICAL FIELD

The present disclosure relates to information handling system management and, more particularly, management of distributed databases in a hybrid cloud computing environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems may be configured to implement a cloud computing environment, sometimes referred to as a public cloud, that provides a user or customer with access to on-demand, network-accessible, and virtualized information handling resources, including virtual storage and computational resources, that are implemented and maintained by a cloud service provider. A hybrid cloud refers to an information handling system configuration that combines a cloud computing environment with the customer's private cloud, which may include a customer's on-premises datacenter, and enables the two clouds to share data and applications.

When a customer maintains a database containing information that is critical to the customer's mission, the customer may elect to employ a distributed database framework that encompasses two or more information handling nodes including a primary node and one or more secondary nodes, each of which maintains a replicate of the primary node database. Traditionally, these distributed, replicated database frameworks have been implemented within an environment that permits each of the nodes to communicate its health state to all of the other nodes. This configuration permits the nodes to determine among themselves with respect to designating one of the nodes as the primary node and all of the remaining nodes as secondary nodes. If the primary node fails, the secondary nodes can detect the failure and determine which secondary node will serve as the primary node. If, however, the nodes are not configured or are unable to communicate with each other directly, the traditional approach just described may be unable to resume operation following a primary node failure.

SUMMARY

In accordance with subject matter disclosed herein, a distributed database management system includes a centralized management module for managing some or all of the resources within a customer's private cloud and/or on-premises datacenter, referred to herein simply as the customer network. The management module software, e.g., vCenter, or a health state plugin of the management module, accesses health state information from distributed database nodes within the customer network. In some embodiments that health state information may be or may include a simple signal, analogous to a heartbeat signal, that each functional node generates periodically and sends to the management module. The nodes may include a primary node to maintain a database and one or more secondary nodes to replicate the database. The primary and secondary nodes may be nodes within an edge node cluster of the customer network. The edge node cluster may be implemented within an infrastructure appliance, e.g., VxRail. The management module shares the health state information with the nodes and controls, based on the health state information, the designation of a primary node and secondary nodes. The health state plugin may employ one or more remote procedure calls (RPCs) to access the health state information and control the primary node designation without exchanging credentials with the public cloud resource. In some embodiments, the distributed database nodes may be communicatively isolated from one another such that the nodes cannot or do not directly exchange health state information with one another.

The primary node may, in some embodiments, establish or access a secure connection with a public cloud resource to provide primary node health state information to the public resource. In some embodiments, the primary node health state information may be the only health state information pertaining to the distributed database that the public cloud resource can access. In at least one embodiment, controlling the primary node designation includes determining from the health state information that the primary node is down, i.e., fully or partially non-functional, and communicating with the secondary nodes to elect, designate, or otherwise select one of the secondary nodes as the primary node.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
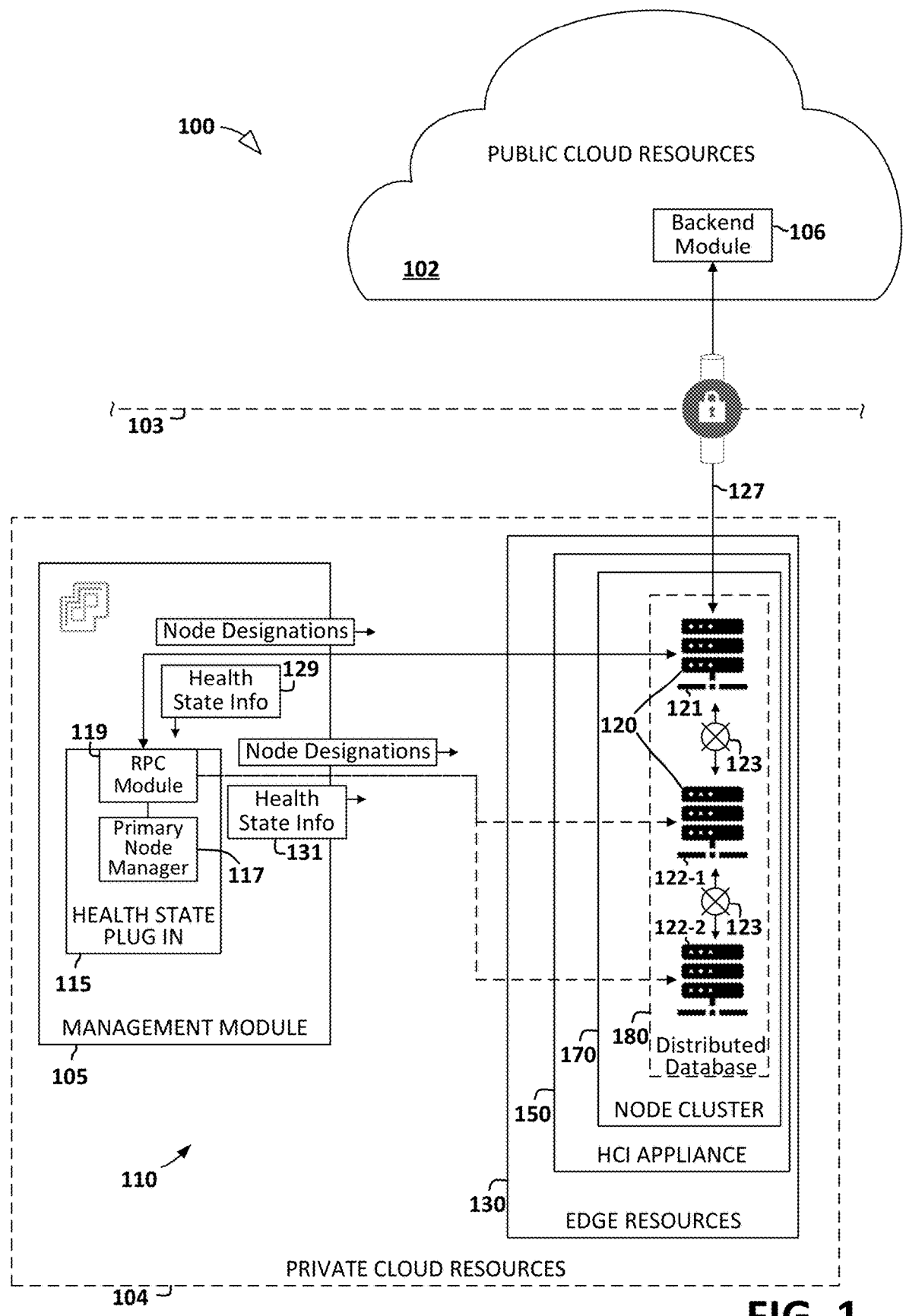
FIG. 1 illustrates a hybrid cloud environment in accordance with disclosed teachings.
Figure 2:
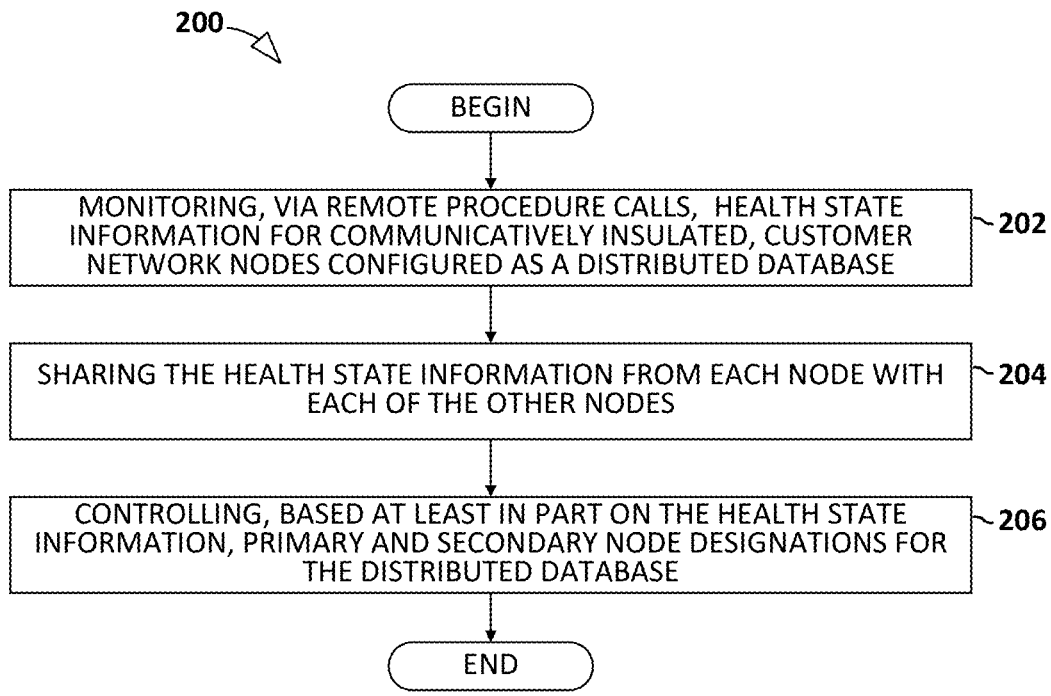
FIG. 2 illustrates a flow diagram of a method for managing distributed system components in accordance with disclosed teachings.
Figure 3:
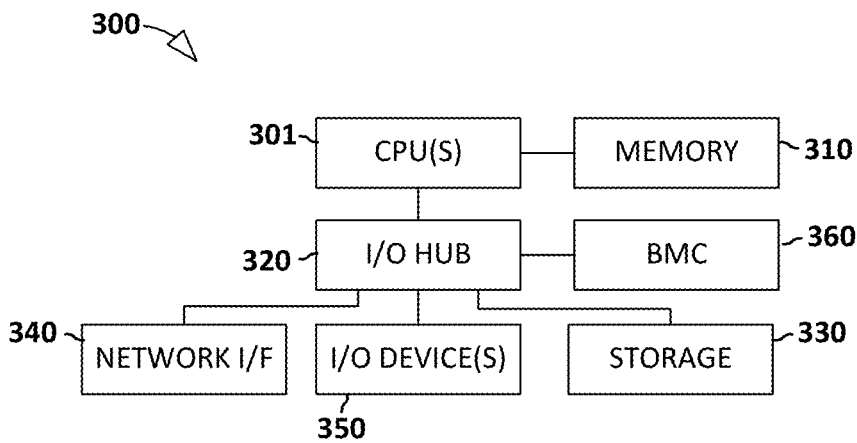
FIG. 3 illustrates a block diagram of an exemplary information handling system suitable for use in conjunction with the method of FIG. 2.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication or mechanical communication, including thermal and fluidic communication, as applicable, whether connected indirectly or directly, with or without intervening elements.

Referring now to the drawings, FIG. 1 illustrates a hybrid cloud environment 100 including public cloud resources 102 "north" of a firewall 103 and private cloud resources 104 "south" of firewall 103. The private cloud resources 104 of FIG. 1 include the trusted network 110 of a person or entity generically referred herein to as a customer. The trusted network 110 depicted in FIG. 1 includes the customer's edge resources 130 and a trusted and centralized management module 105. In some embodiments, edge resources 130 may include physical and/or virtual compute, storage, and network resources within one or more customer-managed data centers, any one or more of which may also be referred to as an on-premises data center. Management module 105 may correspond to a commercially distributed server management software package including, as an exemplary but non-limiting example, vCenter software from VMware.

The edge resources 130 depicted in FIG. 1 include a multi-node database, referred to herein as distributed database 180, to store critical and/or confidential data for one or more applications or services associated with the customer's operations. The nodes 120 of the distributed database 180 illustrated in FIG. 1 include a primary node and one or more secondary nodes 122, two of which are depicted in FIG. 1 as secondary nodes 122-1 and 122-2. Primary node 121 may function as the active database node while secondary nodes 122 may be configured to maintain replicates of the active database node. If, for any reason, primary node 121 fails, a secondary node, e.g., secondary node 122-1, may be designated as the primary node.

The nodes 120 of distributed database 180 may, as illustrated in FIG. 1, be implemented within a node cluster of a hyper-converged infrastructure (HCI) appliance 150. HCI appliance 150 may, in some embodiments, include any of various VxRail appliances from Dell Technologies. Although FIG. 1 illustrates distributed database 180 implemented in an HCI appliance, those of ordinary skill in the field will recognize that other embodiments, not depicted, may employ a different configuration of specific resources.

The nodes of distributed database 180 may be communicatively insulated with respect to one another, as suggested by the icons 123 illustrated in FIG. 1. In this state, nodes 120 cannot or do not communicate directly with one another with respect to at least one or more types of communications including, as a non-limiting example, heart beat communications or other types of communication that indicate the basic functionality and availability of the node.

FIG. 1 further illustrates a secure channel 127 established between a backend module 106 within public cloud resources 102 and the primary node 121. Secure channel 127 may be used to communicate the health state of primary node to backend module 106. In at least some embodiments, the health state information communicated via secure channel 127 may be the only health state information regarding distributed database 180 that is accessible from outside of the customer's trusted network 110.

FIG. 1 further illustrates management module 105 configured with a plugin module identified as health state plugin 115. Health state plugin 115 may be configured to receive, retrieve, request or otherwise obtain access to inbound health state information 129 for each of the nodes and to broadcast or otherwise communicate outbound health state information 131 to each of the other nodes of distributed database 180. Based on the health state information, a primary node manager 117 within health state plugin 115 may elect, or communicate with the other distributed database nodes to elect one of the secondary nodes as a primary node in the event that the existing primary node 121 fails. The health state plugin 115 of FIG. includes a remote procedure call (RPC) module 119 that supports or enables the communication of health state information between the health state plugin 115 and the node resources.

Turning now to FIG. 2, a method 200 for managing distributed system components is illustrated in block diagram format. In at least one embodiment, the illustrated method 200 may be performed by the health state plugin 115 of FIG. 1. The illustrated method 200 includes monitoring (block 202), via remote procedure calls, health state information for communicatively insulated, customer network nodes configured as a distributed database. The health state information is then broadcasted or otherwise shared (block 204) with each node. Based at least in part on the health state information, primary and secondary node designations for the distributed database may then be determined (block 206) by an election or another suitable process.

Referring now to FIG. 3, any one or more of the operations or components illustrated in FIG. 1 or FIG. 2 may be implemented as or within an information handling system exemplified by the information handling system 300 illustrated in FIG. 3. The illustrated information handling system includes one or more general purpose processors or central processing units (CPUs) 301 communicatively coupled to a memory resource 310 and to an input/output hub 320 to which various I/O resources and/or components are communicatively coupled. The I/O resources explicitly depicted in FIG. 3 include a network interface 340, commonly referred to as a NIC (network interface card), storage resources 330, and additional I/O devices, components, or resources 350 including as non-limiting examples, keyboards, mice, displays, printers, speakers, microphones, etc. The illustrated information handling system 300 includes a baseboard management controller (BMC) 360 providing, among other features and services, an out-of-band management resource which may be coupled to a management server (not depicted). In at least some embodiments, BMC 360 may manage information handling system 300 even when information handling system 300 is powered off or powered to a standby state. BMC 360 may include a processor, memory, an out-of-band network interface separate from and physically isolated from an in-band network interface of information handling system 300, and/or other embedded information handling resources. In certain embodiments, BMC 360 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for managing a distributed database, the method comprising:
   accessing, by a management module operating within a customer network, health state information from each of a plurality of distributed database nodes within the customer network, wherein the distributed database nodes comprise nodes within an edge resource node cluster within a hyper-converged infrastructure appliance of the customer network and wherein the distributed database nodes are communicatively isolated with respect to all other nodes in the distributed database, and wherein the distributed database nodes include:
      a primary node to maintain a database and provide primary node health state information to a public cloud resource via a secure channel, wherein the primary node health state information is the only health state information pertaining to the distributed database provided to the public cloud resource; and
      one or more secondary nodes to replicate the database;
   sharing the health state information with the distributed database nodes; and
   controlling, in accordance with the health state information, a primary node designation indicative of a distributed database node designated as the primary node and secondary node designations indicative of distributed database nodes designated as secondary nodes.

2. The method of claim 1, further comprising:
   installing a health state plugin for the management module, wherein the health state plugin performs the accessing of the health state information and the controlling of the primary node designation.

3. The method of claim 2, wherein accessing the health state information includes invoking, by the health state plugin, a remote procedure call to access the distributed database nodes.

4. The method of claim 1, wherein:
the method is performed without providing credentials to or receiving credentials from the public cloud resource.

5. The method of claim 1, wherein controlling the primary node designation includes, responsive to determining from the health state information that the primary node is down, communicating with the secondary nodes to designate one of the secondary nodes as the primary node.

6. An information handling system comprising:
a central processing unit (CPU); and
a non-transitory computer readable memory including processor executable instructions that, when executed by the CPU, cause the information handling system to perform distributed database management operations, wherein the distributed database management operations comprise:
   accessing, by a management module operating within a customer network, health state information from each of a plurality of distributed database nodes within the customer network, wherein the distributed database nodes comprise nodes within an edge resource node cluster within a hyper-converged infrastructure appliance of the customer network and wherein the distributed database are communicatively isolated with respect to all other nodes in the distributed database, and wherein the distributed database nodes include:
      a primary node to maintain a database and provide primary node health state information to a public cloud resource via a secure channel, wherein the primary node health state information is the only health state information pertaining to the distributed database provided to the public cloud resource; and
      one or more secondary nodes to replicate the database;
   sharing the health state information with the distributed database nodes; and
   controlling, in accordance with the health state information, a primary node designation indicative of a distributed database node designated as the primary node and secondary node designations indicative of distributed database nodes designated as secondary nodes;
   wherein the distributed database includes at least one isolated distributed database node, wherein the isolated distributed database node is communicatively isolated with respect to all other distributed database nodes in the distributed database.

7. The information handling system of claim 6, wherein the management operations include:
installing a health state plugin for the management module, wherein the health state plugin performs the accessing of the health state information and the controlling of the primary node designation.

8. The information handling system of claim 7, wherein accessing the health state information includes invoking, by the health state plugin, a remote procedure call to access the distributed database nodes.

9. The information handling system of claim 6 wherein:
the operations are performed without providing credentials to or receiving credentials from the public cloud resource.

10. The information handling system of claim 6, wherein controlling the primary node designation includes, responsive to determining from the health state information that the primary node is down, communicating with the secondary nodes to designate one of the secondary nodes as the primary node.

* * * * *